United States Patent [19]
Watanabe

[11] Patent Number: 4,533,824
[45] Date of Patent: Aug. 6, 1985

[54] AUTOMATIC DEPOSITING/DISPENSING APPARATUS

[75] Inventor: Yoshihiro Watanabe, Fujisawa, Japan

[73] Assignee: Tokyo Shibaura Denki Kabushiki Kaisha, Kawasaki, Japan

[21] Appl. No.: 502,728

[22] Filed: Jun. 9, 1983

[30] Foreign Application Priority Data

Jun. 16, 1982 [JP] Japan .............................. 57-103334

[51] Int. Cl.[3] .............................................. G06F 15/30
[52] U.S. Cl. .................................................. 235/379
[58] Field of Search ................ 235/379; 194/DIG. 26

[56] References Cited

U.S. PATENT DOCUMENTS 4,038,532 7/1977 Widmer .......................... 235/379 X

*Primary Examiner*—Harold J. Pitts
*Attorney, Agent, or Firm*—Cushman, Darby & Cushman

[57] ABSTRACT

In an automatic depositing/dispensing apparatus, a plurality of note storage sections is provided in a housing. Each of the note storage sections stores deposited notes of a denomination and includes a cash box into which notes are collected in one direction, collection/takeout device disposed at one end portion of the cash box, whereby the deposited notes from a note inlet are led and collected into the cash box, and the notes collected in the cash box are taken out and delivered to a note outlet, and a partitioning mechanism capable of selectively assuming a first posture to engage both side edges of the notes stored in the cash box, or a second posture removed from the side edges, and movable between a first position inside the cash box and a second position adjacent to collection/takeout device, so that a temporary storage space is defined between the collection/takeout device and the partitioning mechanism in the first posture and in the first position.

7 Claims, 11 Drawing Figures

AUTOMATIC DEPOSITING/DISPENSING APPARATUS

BACKGROUND OF THE INVENTION

This invention relates to an automatic depositing/dispensing apparatus, and more specifically to an automatic depositing/dispensing apparatus for automatically depositing and dispensing notes at the windows of financial institutions such as banks.

Recently, banks and other financial agencies have started to use, with excellent results, apparatuses called auto-cashiers, such as depositing machines, cash dispensers, customer-operated automatic teller machines (ATM), etc.

In the existing circumstances, however, only the cash dispensers are installed in the lobby counter section of financial agencies for tellers' operation, and no depositing machines are used.

This is for the following reasons. In general, considering the stationing of tellers at the lobby counter, cost of mechanization, and waiting time for each service, it is advisable to set one auto-cashier between each two tellers. Hereupon, the auto-cashier may be so designed that a depositing machine is placed on top of a cash dispenser. With this arrangement, however, it is very difficult to locate the head section of the auto-cashier below the high counter which should be approximately one meter high above the floor. Thus, the head section of the auto-cashier projects above the high counter interfering with the view or causing inconvenience to customers.

Some banking facilities have used apparatuses in which a depositing machine and a cash dispenser are arranged side by side. However, these apparatuses have been abandoned, since it is very awkward for each of two adjoining tellers to operate the apparatus on his neighbor's depositing machine or cash dispenser.

With the conventional manual counting system, a cashier hands a very small sum of money to each teller in the morning. The tellers appropriate bank notes received from depositing customers for dispensing to drawing customers. Thus, the efficiency of fund flow at the teller's window is improved. If the depositing machine and the cash dispenser are installed independently, however, a considerable amount of bank notes for payment will have to be set in the cash dispenser, while bank notes will steadily accumulate in the depositing machine. Thus, the efficiency of fund operations is lowered.

To counter the circulation of forged notes accelerated by the recent progress and spread of printing technology, importance is attached to the authenticity decision at teller's windows. Also, there is an urgent demand for mechanization at the windows for accurate counting operation and higher personnel efficiency.

In order to meet these various requirements, there have been proposed depositing/dispensing apparatuses in which a judgment section and a note outlet, as well as a control section and drive systems, are used in common for depositing and dispensing operations to improve space efficiency. Moreover, these apparatuses use a compact housing to satisfy all those requirements except that for higher efficiency of fund operations.

However, the improvement of efficiency of fund operations, as well as the rationalization of personnel management, is essential to the service at the teller's windows of financial institutions. Accordingly, there has been an increasing demand for the development of depositing/dispensing apparatuses of an automatic circulation type which directly adopt the current window system to appropriate deposited funds for payment.

An example of the prior art depositing/dispensing apparatus of the automatic circulation type is disclosed in Japanese Patent Disclosure No. 33757/81. In this depositing/dispensing apparatus, however, a storage section for storing deposited notes to be appropriated for dispensation is provided independently of a temporary storage space for temporarily keeping the deposited notes before storing them in the storage section because some of the notes may have to be returned. Thus, the space for the storage of the notes is large, and constitutes a hindrance to the manufacture of a compact depositing/dispensing apparatus adapted for teller window operation.

SUMMARY OF THE INVENTION

This invention is contrived in consideration of these circumstances, and is intended to provide an automatic depositing/dispensing apparatus of a note circulation type, improved in compactness and adapted for teller window operation.

In order to attain the above object, an apparatus according to this invention is so designed that partitioning means capable of reciprocation is attached to a note storage section to provide a temporary storage space therein, whereby the overall space for the storage is minimized to reduce the size of the apparatus as a whole.

DETAILED DESCRIPTION OF THE PREFERRED EMBODIMENT

Figure 1:
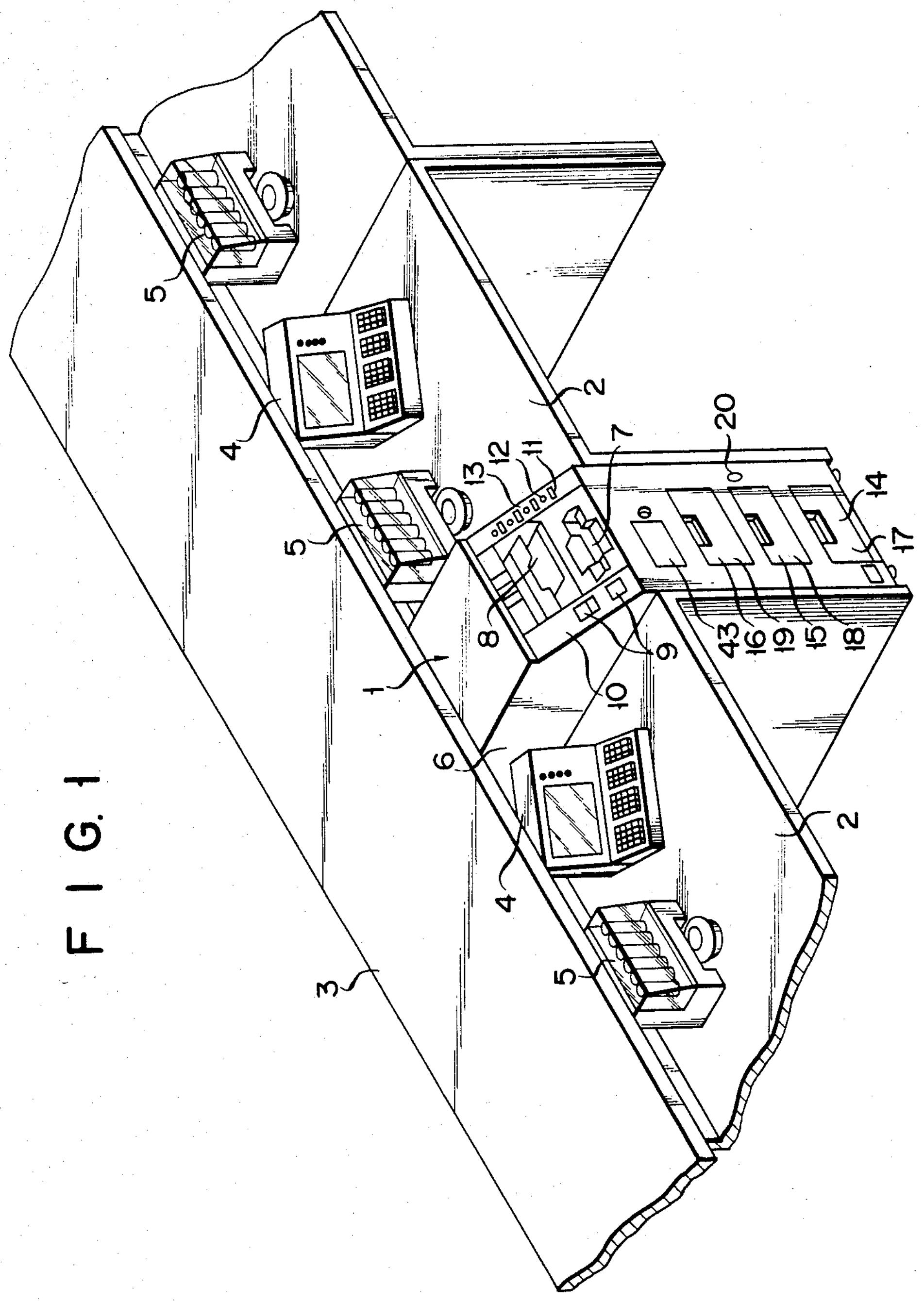
FIG. 1 is a perspective view showing a lobby counter section furnished with an automatic depositing/dispensing apparatus of one embodiment according to this invention.

One embodiment of an automatic depositing/dispensing apparatus according to this invention will be described with reference to the accompanying drawings. FIG. 1 shows a lobby counter section of a financial agency such as a bank. In FIG. 1, numeral 1 designates a depositing/dispensing apparatus of an automatic note circulation type. The depositing/dispensing apparatus 1 is disposed between a pair of tables 2 for a couple of tellers' use. The depositing/dispensing apparatus 1 has a height such that it can be installed under a high counter 3. Thus, the depositing/dispensing apparatus 1 neither interferes with the view nor bothers customers.

A teller's window apparatus 4 capable of card reading, data input, operating instruction, passbook printing, slip printing, approval printing, etc., and a coin dispenser 5 are placed on each table 2. Tellers conduct accounting business using apparatuses 4 and 5 and the depositing/dispensing apparatus 1.

The depositing/dispensing apparatus 1 has a housing 6 whose upper end is slanted in front. Arranged at the slanted portion are a note inlet section 7, a note outlet section 8, an operating section 10 provided with a plurality of operating buttons 9, and an indicating section 13 including a plurality of content indicating portions 11 and luminous portions 12 corresponding thereto. First, second and third cashboxes 19, 18 and 17 constitute, respectively, a first storage section 16 for storing first-denomination notes Pa (ten-dollar notes, ten-mark notes or five-pound notes), a second storage section 15 for storing second-denomination notes Pb (hundred-dollar notes, hundred-mark notes or twenty-pound notes), and a third storage section 14 for storing third-denomination notes Pc (fifty-dollar notes, fifty mark notes or ten-pound notes) and unsuitable notes for dispensing such as rejected ones. If a key is inserted in a lock 20, the first to third cashboxes 19, 18 and 17 are unlocked and can be drawn out.

Figure 2A:
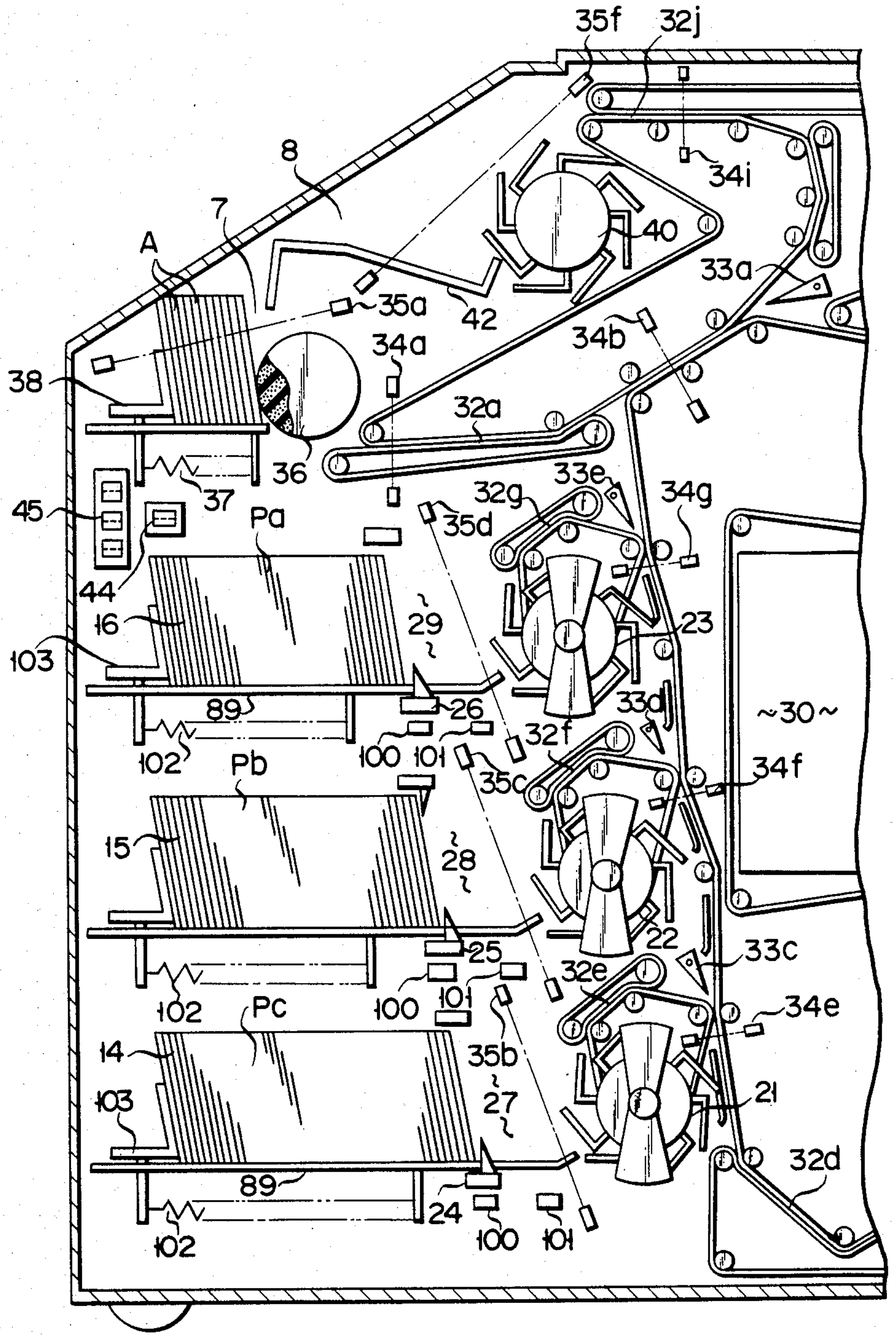
FIGS. 2A and 2B are vertical sectional views schematically showing the left and right halves of side of the depositing/dispensing apparatus, respectively.
Figure 2B:
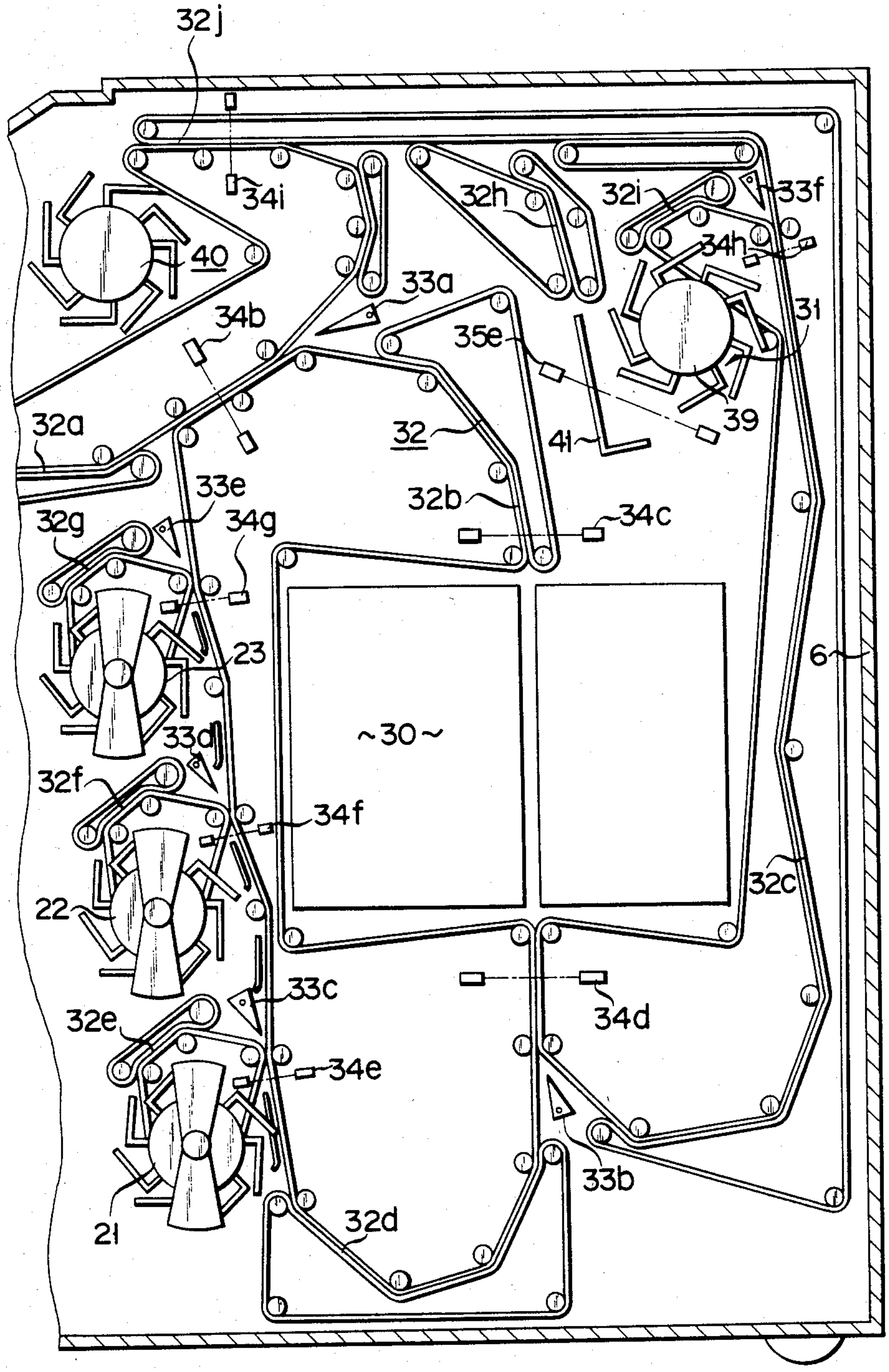

Referring now to FIGS. 2A and 2B, the construction of the depositing/dispensing apparatus 1 will be described in detail. The note outlet section 8 and the note inlet section 7 are defined at the upper front portion (upper left portion in FIG. 2) of the inside space of the housing 6. The first, second and third storage sections 16, 15 and 14 are arranged under the note inlet section 7 in a descending manner. First, second and third collection/takeout devices 21, 22 and 23 are arranged substantially halfway between the front and back walls of the housing 6 so as to face the storage sections 14, 15 and 16, respectively. The storage sections 14, 15 and 16 are provided, respectively, with separator mechanisms 24, 25 and 26 as partitioning means for separating those notes handled in the transaction concerned from those handled in the previous transactions. Temporary storage spaces 27, 28 and 29 are defined between the separator mechanisms 24, 25 and 26 and their corresponding collection/takeout devices 21, 22 and 23, respectively.

A judgment section 30 is disposed in the rear portion of the interior of the housing 6 substantially halfway between the top and bottom of the housing 6. A reversal section 31 is set above the judgment section 30.

A note conveyor path 32 is formed in the housing 6 so that notes P can be carried into those individual sections. The note convey path 32 consists of first to tenth conveyor paths 32*a* to 32*j*. The first conveyor path 32*a* serves as a lead-in path through which those notes inserted into the note inlet section 7 are fed into the housing 6. The second conveyor path 32*b* follows the first conveyor path 32*a* and carries the notes through the judgment section 30. Also, the first conveyor path 32*a* is followed by the tenth conveyor path 32*j*, which feeds the notes into the note outlet section 8. In other words, the second and tenth conveyor paths 32*b* and 32*j* diverge from the first conveyor path 32*a*. After passing through the judgment section 30, the second conveyor path 32*b* terminates at the lower portion of the housing 6, from which diverge the third and fourth conveyor paths 32*c* and 32*d*. The third conveyor path 32*c* delivers the notes to the tenth conveyor path 32*j* through the space behind the judgment section 30 and the reversal section 31. The fourth conveyor path 32*d* delivers the notes to the first conveyor path 32*a* through the space in front of the judgment section and beside the first to third collection/takeout devices 21, 22 and 23. The fifth conveyor path 32*e* diverges from the middle portion of the fourth conveyor path 32*d* to carry the notes into the first collection/takeout device 21. Likewise, the sixth and seventh conveyor paths 32*f* and 32*g* diverge from the middle portion of the fourth conveyor path 32*d* to carry the notes into the second and third collection/takeout devices 22 and 23, respectively. The ninth conveyor path 32*i* diverges from the third conveyor path 32*c* to carry the notes into the reversal section 31. The eighth conveyor path 32*h* is provided for returning the reversed notes to the third conveyor path 32*c*. As shown in FIGS. 2A and 2B, the first to third and fifth to tenth conveyor paths 32*a* to 32*c* and 32*e* to 32*j* are each defined by opposite portions of a pair of belts facing each other. The fourth conveyor path 34*d* is defined by opposite portions of a pair of belts facing each other and opposite portions of a belt and a guide plate facing each other.

First to sixth distributing gates 33*a* to 33*f* driven by a rotary solenoid (not shown) are arranged at the diverging portions of the conveyor paths. The first distributing gate 33*a* is provided at the forked portion between the second and tenth conveyor paths 32*b* and 32*j* which diverge from the first conveyor path 32*a*. The second distributing gate 33*b* is provided at the forked portion between the third and fourth conveyor paths 32*c* and 32*d* which diverge from the second conveyor path 32*b*. The third, fourth and fifth distributing gates 33*c*, 33*d* and 33*e* are arranged at the forked portions between the fourth conveyor path 32*d* and the fifth, sixth and seventh conveyor paths 32*e*, 32*f* and 32*g*, respectively. The sixth distributing gate 33*f* is provided at the forked portion between the third and ninth conveyor paths 32*c* and 32*i*.

First to ninth passage sensors 34*a* to 34*i* are arranged in the middle of the note conveyor path 32. The first passage sensor 34*a* is set across the first conveyor path 32*a* near the note inlet section 7; the second passage sensor 34*b* across the first conveyor path 32*a* near the diverging portion thereof, the third passage sensor 34*c* across the second conveyor path 32*b* just short of the judgment section 30, the fourth passage sensor 34*d* across the second conveyor path 32*b* just beyond the judgment section 30, the fifth passage sensor 34*e* across the fourth conveyor path 32*d* just short of the forked portion between the fourth and fifth conveyor paths 32*d* and 32*e*, the sixth passage sensor 34*f* across the fourth conveyor path 32*d* just short of the forked portion between the fourth and sixth conveyor paths 32*d* and 32*f*, the seventh passage sensor 34*g* across the fourth conveyor path 32*d* just short of the forked portion between the fourth and seventh conveyor paths 32*d* and 32*g*, the eighth passage sensor 34*h* across the third conveyor path 32*c* just short of the forked portion between the third and ninth conveyor paths 32*c* and 32*i*, and the ninth passage sensor 34*i* across the tenth conveyor path 32*j* just short of the note outlet section 8.

Remaining note check sensors 35*a* to 35*f* are arranged in the individual collecting portions for collecting the notes.

The note inlet section 7 is provided with a pickup roller 36 which is coated with knurled rubber with a high coefficient of friction. The inserted notes are pressed against the pickup roller 36 by a backup member 38 urged by a pressure spring 37. The pressed notes are picked up one by one with every revolution of the pickup roller 36.

A pair of vane wheels 39 and 40 are arranged at the reversal section 31 and the note outlet section 8, respectively. The notes transferred by the ninth or tenth conveyor path 32*i* or 32*j* are received between the vanes of the vane wheel 39 or 40, and are regularly collected on a bearer 41 or 42. The notes collected on the bearer 41 of the reversal section 31 are collectively fed into the eighth conveyor path 32*h* when a pinch roller (not shown) is actuated by a magnet and pressed against the belt.

Also, the housing 6 contains therein a circulation prohibiting switch 44 and a judgment level adjusting switch 45 which can be activated by opening a swinging door 43 (FIG. 1).

Figure 3A:
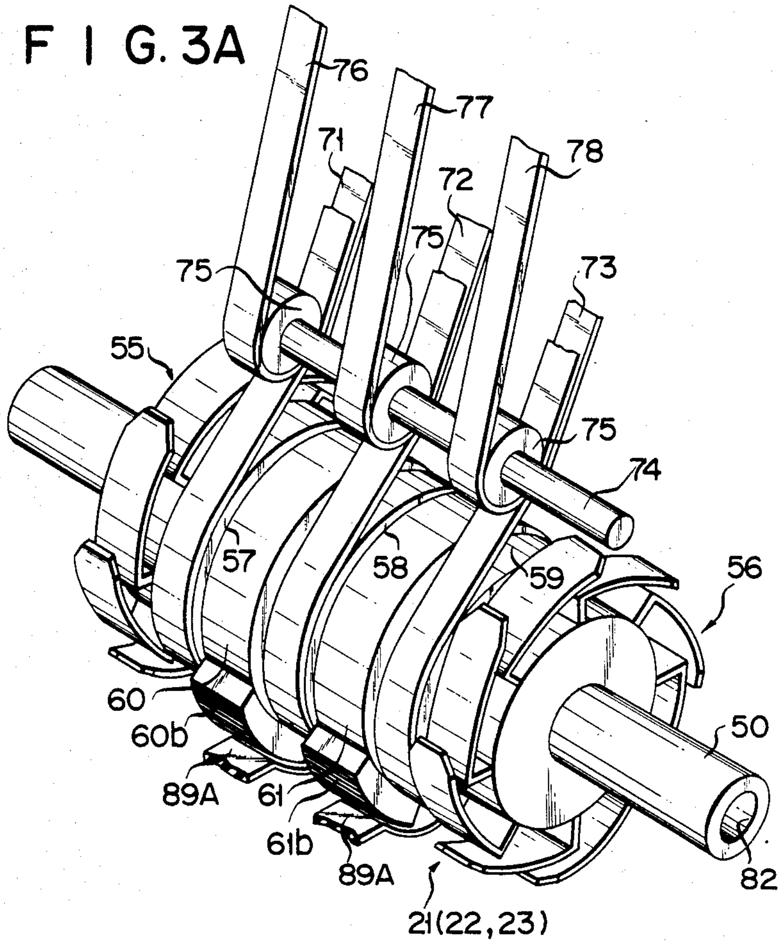
FIG. 3A is a perspective view showing a collection/-takeout device.
Figure 3B:
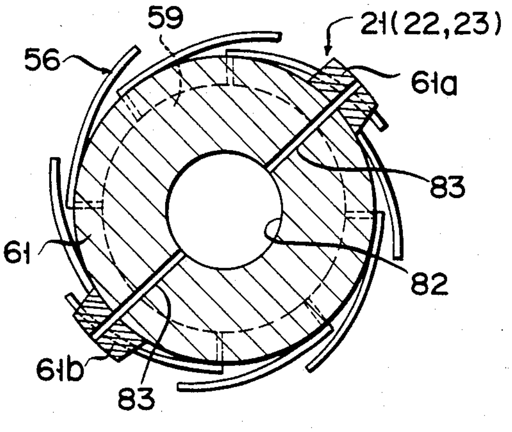
FIG. 3B is a sectional view showing a rotor of the collection/takeout device.
Figure 4:
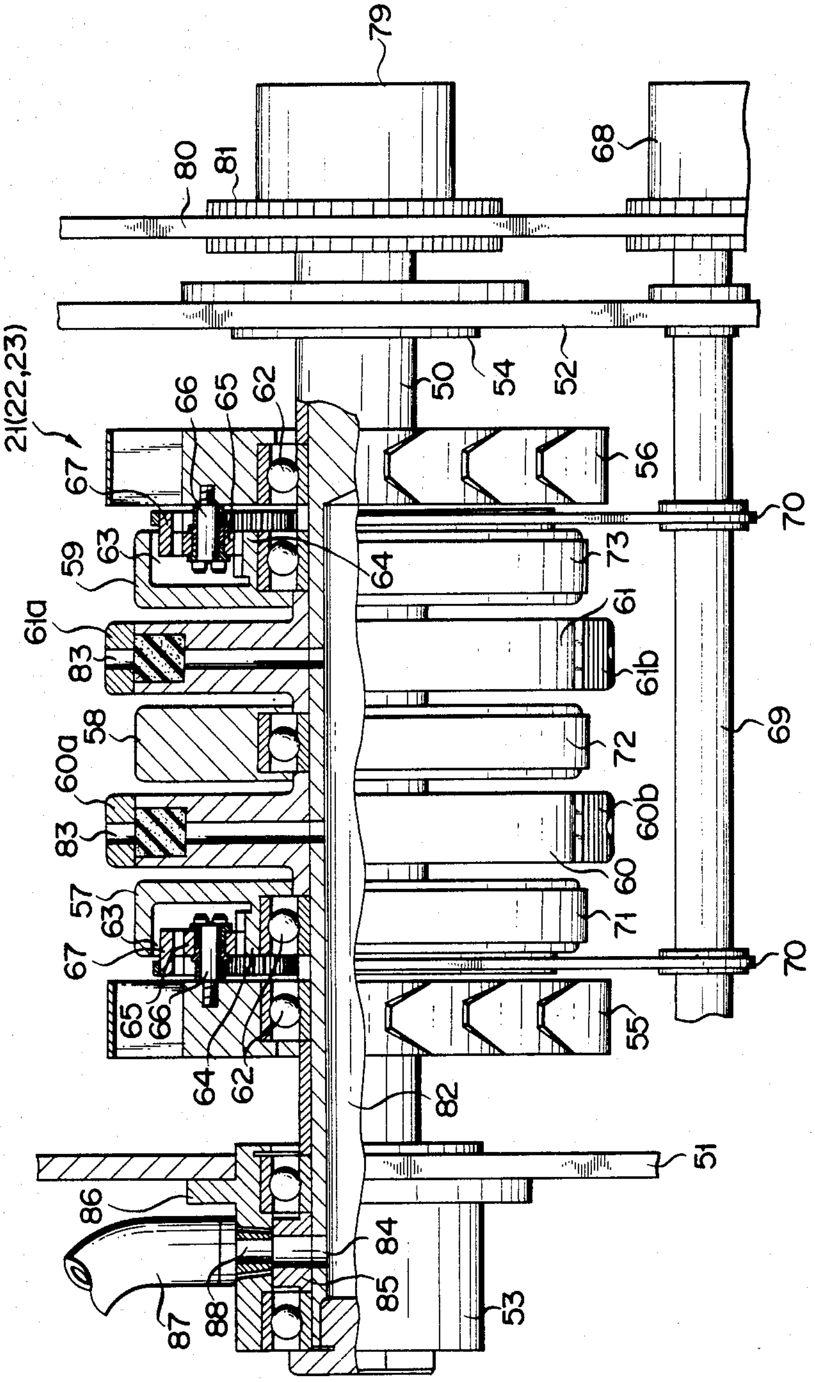
FIG. 4 is a partial sectional view showing the collection/takeout device.

Referring now to FIGS. 3A, 3B and 4, the first, second and third collection/takeout devices 21, 22 and 23 will be described in detail. These collection/takeout devices 21, 22 and 23 have the same construction, and serve to collect and take out the notes.

Each of the collection/takeout devices 21, 22 and 23 is provided with a main shaft 50. The main shaft 50 is rotatably supported at both ends by bearing units 53 and 54 which are attached to frames 51 and 52, respectively, in the housing 6. The main shaft 50 is fitted with a pair of collecting vane wheels 55 and 56, first to third belt pulleys 57, 58 and 59, and a pair of rotors 60 and 61 as takeout mechanisms including a pair of takeout chips 60*a* and 60*b* and another pair of chips 61*a* and 61*b*, respectively. All these members on the main shaft 50 are located between the frames 51 and 52. The vane wheels 55 and 56 and the first and third belt pulleys 57 and 59 are rotatably mounted on the main shaft 50 by means of their respective bearings 62, while the rotors 60 and 61 are fixedly attached to the main shaft 50.

The first and third belt pulleys 57 and 59 are coupled to the vane wheels 55 and 56, respectively, by means of planetary-gear reduction mechanisms 63. Thus, the vane wheels 55 and 56 rotate at a speed reduced to a sixteenth of the rotating speed of the belt pulleys 57 and 59. As shown in FIG. 4, a gear 64 is coaxially fixed in each of the first and third belt pulleys 57 and 59. The gear 64 is in mesh with a plurality of planet gears 65. Rotating shafts 66 of the planet gears 65 are fixed to the body portion of their corresponding vane wheel 55 or 56. Also, the planet gears 65 of each pulley 57 or 59 are in mesh with an internal gear 67. The internal gears 67 of the pulleys 57 and 59 are driven by belts 70 and a common rotating shaft 69 which is controlled in rotation by an electromagnetic clutch 68. Thus, these two internal gears 67 are operated synchronously. In collecting the notes, the internal gears 67 are fixed, so that the vane wheels 55 and 56 rotate at a speed equal to a sixteenth of that of the belt pulleys 57 and 59. In taking out the notes, the internal gears 67 are forced to rotate so that the rotors 60 and 61 and the vane wheels 55 and 56 rotate at the same speed and in the same direction.

First, second and third conveyor belts 71, 72 and 73 are passed around the first, second and third belt pulleys 57, 58 and 59, respectively. Among these conveyor belts 71, 72 and 73, the first and third belts 71 and 73 on the first and third belt pulleys 57 and 59 which interlock with the first and third vane wheels 55 and 56, respectively, are formed of timing belts (toothed belts) lest the vanes of the vane wheels 55 and 56 be dislocated from one another. These timing belts relatively fix timing pulleys (not shown) on another shaft (not shown) to drive the two conveyor belts 71 and 73.

As shown in FIG. 3A, a rotating shaft 74 is disposed parallel to the main shaft 50. Three pulleys 75 are fixed on the rotating shaft 74. Conveyor belts 76, 77 and 78 are passed around the pulleys 75 and turned up. Parts of the conveyor belts 71, 72 and 73 overlap the turnup portions of the conveyor belts 76, 77 and 78, respectively. The facing portions of these conveyor belts constitute the fifth, sixth or seventh conveyor path 32*e*, 32*f* or 32*g* whereby the notes distributed by the distributing gate 33*c*, 33*d* or 33*e* are held and carried into the spaces between the vanes of the vane wheels 55 and 56.

A timing pulley 81 is mounted on the main shaft 50 by means of a half-turn electromagnetic clutch 79. A timing belt 80 is passed around the timing pulley 81. The drive force of the timing pulley 81 is transmitted to the main shaft 50 when the half-turn electromagnetic clutch 79 is connected. The main shaft 50 is stopped except when taking out the notes. Each of the rotors 60 and 62 integrally attached to the main shaft 50 is fitted with the takeout chips 60*a* and 61*a* or 60*b* and 61*b* arranged on the peripheral surface thereof at a phase angle of 180°. As shown in FIG. 3B, some takeout chips 60*a* and 61*a* are stopped at such positions that they never interfere with the insertion and collection of the notes in the vane wheels 55 and 56. The other takeout chips 60*b* and 61*b* serve also as stoppers to draw out the notes from the spaces between the vanes.

The takeout chips 60*a*, 60*b*, 61*a* and 61*b* are formed of high friction knurled rubber baked on the peripheral surfaces of the rotors 60 and 61. Each of the takeout chips has a suction hole 83 which communicates with a bore 82 formed in the main shaft 50 so as to extend along its axis. A valve mechanism 85 having a communication hole 84 connecting with the bore 82 is fitted on one end portion of the main shaft 50. When the main shaft 50 is intermittently rotated by 180° at a time by the half-turn electromagnetic clutch 79, the valve mechanism 85 rotates relatively to a housing 86 with a narrow gap between them. The housing 86 has a suction hole 88 which communicates with an external vacuum generator (not shown) by means of a pipe 87. The suction hole 88 and the communication hole 84 of the valve mechanism 85 face and connect with each other at every predetermined timing for takeout. Accordingly, the pressure inside the bore 82 of the main shaft 50 becomes negative at every predetermined takeout timing, so that the pressure inside the suction holes 83 of the takeout chips 60*a*, 61*a*, 60*b* and 61*b* of the rotors 60 and 61 connecting with the bore 82 also becomes negative.

Thus, as the half-turn electromagnetic clutch 79 is actuated to cause the main shaft 50 to make a half turn, the suction holes 83 of the takeout chips 60*a* and 61*a* or 60*b* and 61*b* of the rotors 60 and 61 are subjected to negative pressure. Accordingly, the foremost note facing the paths of travel of the takeout chips 60*a*, 61*a*, 60*b* and 61*b* is sucked by a vacuum, and is taken out as the rotors 60 and 61 rotate. The note taken out in this manner is inserted between the conveyor belts 71, 72 and 73 and another set of conveyor belts (not shown) superposed thereon. The intermittent operation of the half-turn electromagnetic clutch 79 is performed by exciting a trigger magnet to release a trigger pin.

As shown in FIG. 3A, a pair of brake belts 89A are arranged opposite to the paths of travel of the takeout chips 60*a*, 61*a*, 60*b* and 61*b*. The brake belts 89A serve to rub the note, thereby preventing the second note and the following ones from being taken out with the first one.

While the outer peripheral surfaces of the takeout chips 60*a*, 61*a*, 60*b* and 61*b* are substantially flush with those of the vane wheels 55 and 56, the conveyor belts 71, 72 and 72 are radially recessed from the outer peripheral surfaces of the vane wheels 55 and 56.

Figure 5:
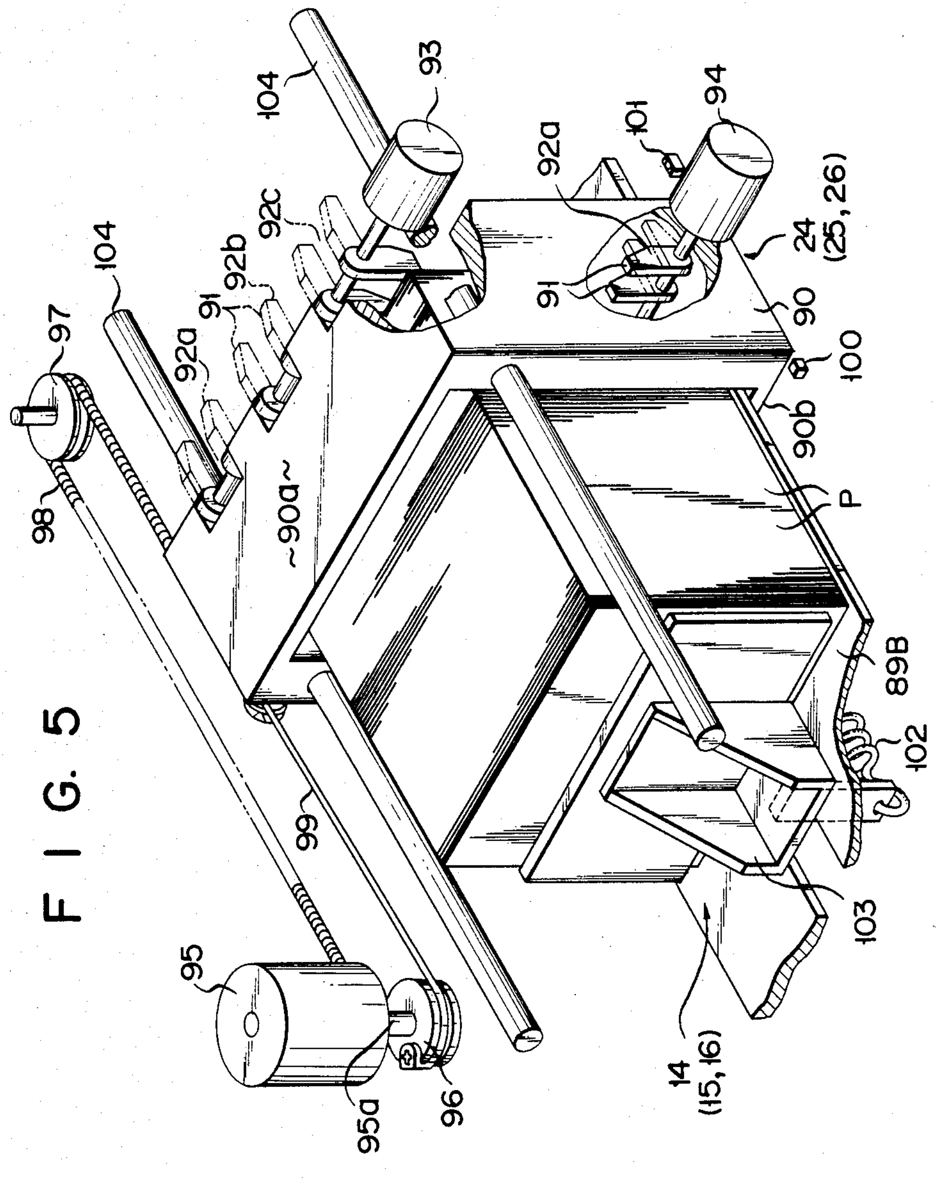
FIG. 5 is a broken-away perspective view showing a separator mechanism.

Referring now to FIG. 5, there will be described the construction of the separator mechanisms 24, 25 and 26 as the partitioning means. These separator mechanisms 24, 25 and 26 have the same construction. Each of the first to third storage sections 14, 15 and 16 is provided with a fixed bearer 89B, and a rectangular movable frame 90 surrounding the notes collected on the bearer 89B. The movable frame 90 is supported by a pair of guide rods 104 so as to be able to reciprocate in the note collecting direction. Each of the separator mechanisms 24, 25 and 26 is provided with three sets of flappers 92*a*, 92*b* and 92*c* each consisting of two pairs of claws 91 arranged on upper and lower horizontal frame portions 90*a* and 90*b* of the movable frame 90. The upper and lower pairs of flappers 92*a*, 92*b* and 92*c* can be rotated by rotary solenoids 93 in a 90-degree arc between a horizontal position represented by two-dot chain lines and an upright position represented by full lines.

A driving pulley 96 mounted on a drive shaft 95*a* of a motor 95 having a reduction gear is disposed in the vicinity of one end of the one guide rod 104, while a driven pulley 97 is located close to the other end of the rod 104. The movable frame 90 is connected with one end of a spring belt 98 the other end of which is fixed to the frame portion near the driving pulley 96 and the middle portion of which is passed around the driven pulley 97 and turned up, and with one end of a wire 99 the other end of which is coupled to the driving pulley 96. An initial position detector 100 and an advanced position detector 101 are individually disposed beside the bearer 89B to keep the movable frame 90 in a normal stop position. Normally, the movable frame 90 is held in the position where the initial position detector 100 is located. The movable frame 90 is normally pushed toward its corresponding collection/takeout device 21, 22 or 23 by the collected notes that are held against a backup member 103 urged by a pressure spring 102. The pressure on the movable frame 90 from the pressure spring 102 is approximately 1.2 kg/cm$^2$ in the case where the storage section 14, 15 or 16 is loaded with 1,400 notes, i.e., the maximum load. This pressure is about one third the force required to reverse the motor 95 having a 1/100-reduction gear, i.e., 3.5 kg/cm$^2$. Even after the motor 95 is deenergized, therefore, the movable frame 90 will never be moved from the position of the position detector 100 or 101.

The upper and lower flappers 92*a*, 92*b* and 92*c* are located in such relative positions that the takeout chips 60*a*, 61*a*, 60*b* and 61*b* of the rotors 60 and 61 can pass between the flappers 92*a*, 92*b* and 92*c*, and that the conveyor belts 71, 72 and 73 can pass between the claws 91 of the flappers 92*a*, 92*b* and 92*c*, respectively. Thus, even though the movable frame 90 advances to the advanced position, the flappers 92*a*, 92*b* and 92*c* will never abut against the collection/takeout devices 21, 22 and 23.

When the motor 95 drives the driving pulley 96 in the forward direction, the wire 99 is wound up to retreat against the urging force of the spring belt 98 the movable frame 90 which has its upper and lower horizontal frame portions fitted with the flappers 92*a*, 92*b* and 92*c*. When the motor 95 drives the driving pulley 96 in the reverse direction, on the other hand, the movable frame 90 is advanced by the urging force of the spring belt 98.

Referring now to FIGS. 2 and 6 to 9, there will be described the depositing and dispensing operations of the apparatus of this invention.

Figure 6:
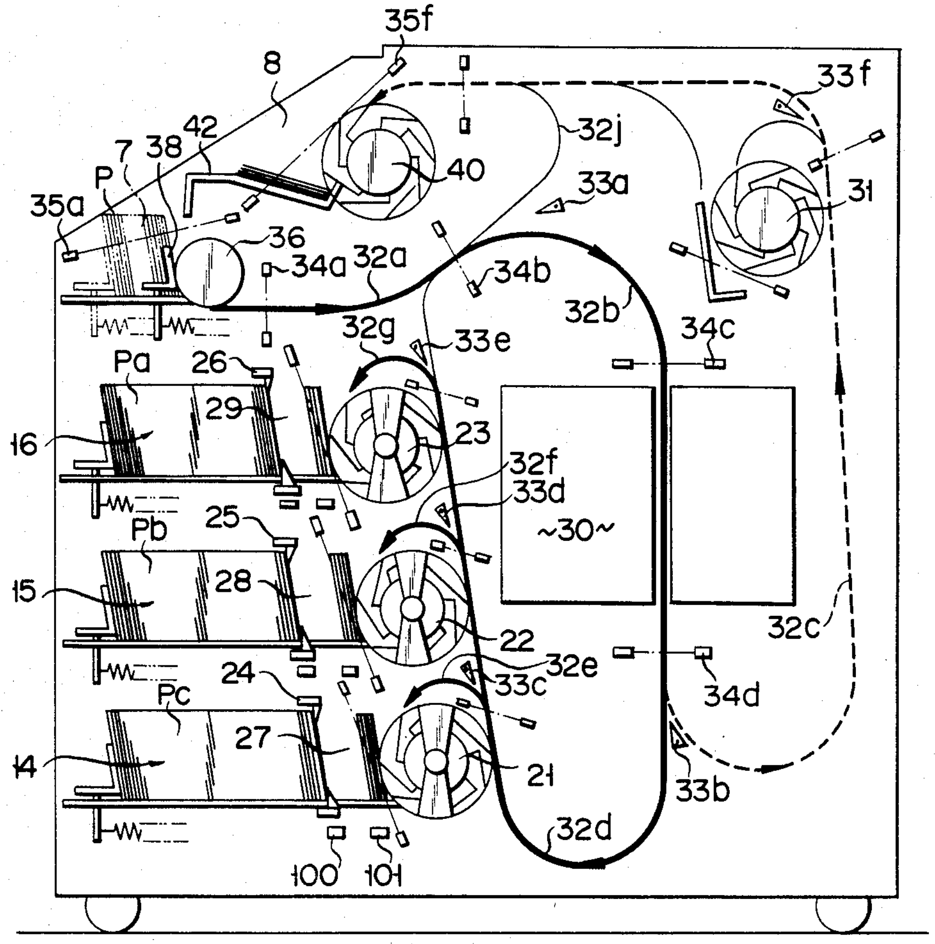
FIG. 6 is a side view for schematically illustrating the flow of deposited notes being collected into temporary storage spaces or rejected.

Referring first to FIGS. 2 and 6, operations for temporary collection and rejection of notes will be explained. At most, about 400 notes P in a bundle are collectively set in the note inlet section 7 without regard to denomination and orientation. Thereupon, the bundle of notes P is pressed against the pickup roller 36 under a suitable pressure by the backup member 38. Then, the start button 9 of the operating section 10 is depressed to drive the conveyor belts constituting the note conveyor path 32. When the running speed of the conveyor belts reach a constant speed, the pickup roller 36 is rotated as an electromagentic clutch (not shown) is thrown in. Thus, the pickup roller 36 starts to pick up the notes P one by one for each revolution thereof. At this time, the first distributing gate 33*a* is switched so that the tenth conveyor path 32*j* is closed to feed the notes P on the first conveyor path 32*a* to the second conveyor path 32*b*. The introduced notes P are counted by the first, second and third remaining note check sensors 34*a*, 34*b* and 34*c* while successively shifting their passage, and are delivered to the judgment section 30.

The note judgment system used in this judgment section 30 is quite different from the conventional judgment system to check the notes for partial characteristics. Namely, in this judgment section 30, the notes P are checked for the width, length, magnetic pattern matching, color analysis of transmitted light, and fine-section matching by reflected light, thereby effecting the four detecting functions of the judgment section 30, denomination detection, authenticity detection, fit/unfit detection, and obverse/reverse detection. Deposited notes P are subjected only to the denomination detection and authenticity detection.

If there are any notes P which are judged counterfeit or not genuine by the authenticity detection because they are superposed, greatly skewed, or broken, then the second distributing gate 33*b* is rocked to the left to close the fourth conveyor path 32*d* at the instant that the forward end portion of each counterfeit note reaches the fourth passage sensor 34*d*. After reaching the terminal end portion of the second conveyor path 32*b*, the notes P to be rejected are transferred to the note outlet section 8 through the third conveyor path 32*c*, as indicated by broken-line arrow. The pair of vane wheels 40 rotating at low speed are provided at the note outlet section 8. The to-be-rejected notes P transferred at high speed are decelerated by the vane wheels 40 and stacked in succession on the bearer 42 at the reduced speed.

Those notes P which have been judged genuine by the authenticity detection are led to the fourth conveyor path 32*d* by the second distributing gate 33*b* switched so as to close the third conveyor path 32*c*, as indicated by heavy full-line arrow. Thereafter, the third-denomination notes Pc are fed to the fifth conveyor path 32*e*, which extends to the third storage section 14, by the third distributing gate 33*c* so switched as to close the fourth conveyor path 32*d*. Likewise, the second-denomination notes Pb are fed to the sixth conveyor path 32*f*, which extends to the second storage section 15, by the fourth distributing gate 33*d* switched so as to close the fourth conveyor path 32*d*, and the first-denomination notes Pa are fed to the seventh conveyor path 32*g*, which extends to the first storage section 16, by the fifth distributing gate 33*e* switched so as to close the fourth conveyor path 32*d*. At this moment, in the storage sections 14, 15 and 16, their corresponding separator mechanisms 24, 25 and 26 are located in the initial position, and the previously stored notes P are pressed by the upper and lower flappers 92*a*, 92*b* and 92*c*. Thus, the temporary storage spaces 27, 28 and 29 are defined between the collection/takeout devices 21, 22 and 23 and their corresponding separator mechanisms 24, 25 and 26.

The notes Pa, Pb or Pc carried on the fifth, sixth and seventh conveyor paths 32*e*, 32*f* and 32*g*, that is, between the set of conveyor belts 71, 72 and 73 and the other set of belts 76, 77 and 78 (as shown in FIG. 3A), are collected in the temporary storage section 27, 28 or 29 by means of the vane wheels 55 and 56 of their corresponding collection/takeout device 21, 22 or 23 rotating at low speed, as described before with reference to FIGS. 3A, 3B and 4.

When the remaining note check sensor 35*a* detects that all the notes P in the note inlet section 7 are taken into the apparatus, the remaining note check sensor 35*f* checks the note outlet section 8 for the existence of the note(s) P. If there is any note or notes P in the note outlet section 8, the indicating section 13 makes an indication to request reinsertion. If there is no note in the note outlet section 8, the apparatus proceeds to an approval step to decide on whether the temporarily stored notes P are to be collected together with the previously collected notes P in the storage sections 14, 15 and 16, or whether the notes P are to be automatically returned to the note outlet section 8.

Figure 7:
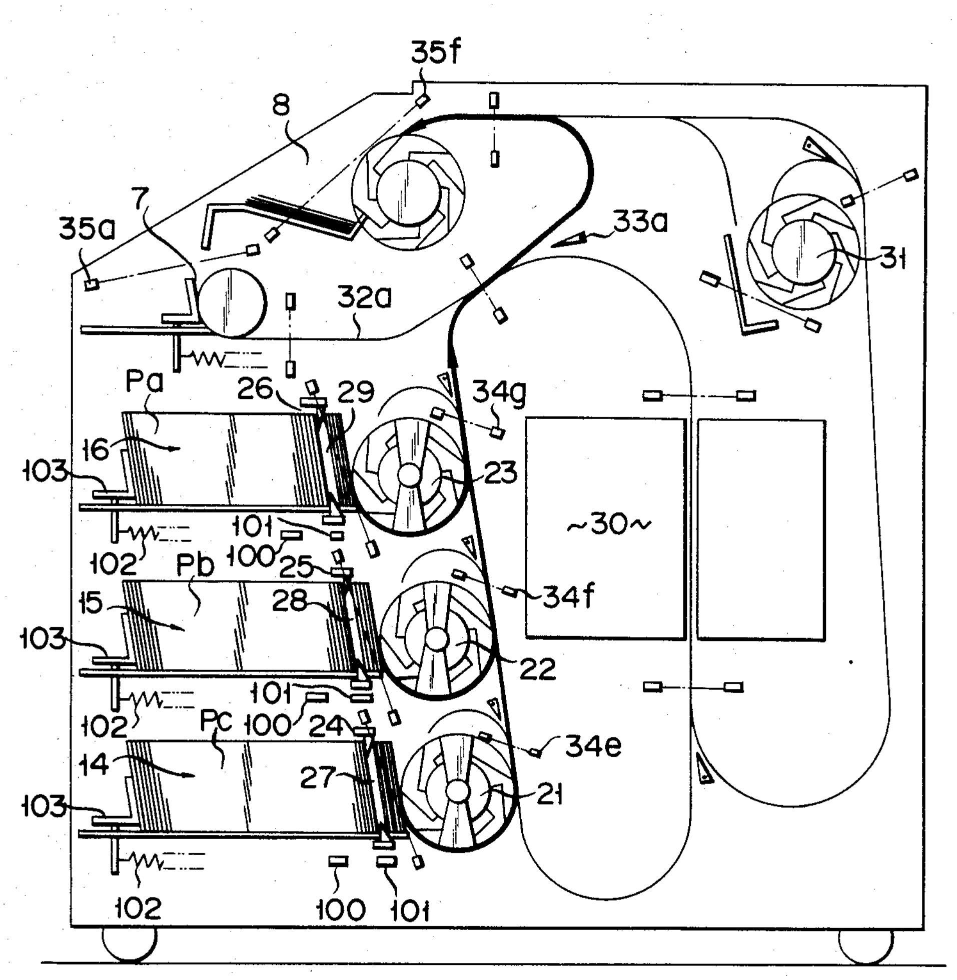
FIG. 7 is a side view for schematically illustrating the flow of deposited notes being returned.

Referring now to FIGS. 2, 5 and 7, there will be described the automatic returning operation for the deposited notes P collected in the temporary storage spaces 27, 28 and 29. When the introduction of the notes P is completed to change the sensor 35*a* at the note inlet section 7 from "dark" to "light", the approval step is started. Thereupon, an approval button is depressed for on-line communication between a host computer keeping a ledger and a CPU (central processing unit) of the depositing/dispensing apparatus. If the deposited notes P cannot be accepted because, for example, the depositor's passbook is not in order, then a command "unacceptable" is delivered from the host computer. In this case, the deposited notes P are returned automatically. First, the motors 95 of the separator mechanisms 24, 25 and 26 are rotated to drive the corresponding movable frames 90 toward their corresponding advanced position detectors 101.

Hereupon, each detector 101 is set in such a position that it operates when there is no temporarily stored note, that is, when each corresponding movable frame 90 is advanced to its foremost position. If any notes are stored temporarily, therefore, the movable frame 90 is stopped from advancing at the position where the flappers 92*a*, 92*b* and 92*c* abut against the notes, and the wire 99 slackens. This is done because the drive motor 95 is a pulse motor which drives the movable frame 90 for a distance equal to the distance from the initial position to the advanced position. Since the wire 99 is thus slackened, the flappers 92*a*, 92*b* and 92*c*, urged by the spring 102, press the temporarily stored notes P against their corresponding collection/takeup device 21, 22 or 23 through the medium of their corresponding backup member 103 and the collected notes P.

Thereupon, the half-turn electromagnetic clutches 79 are engaged, and the second-, third- and first-denomination notes Pb, Pc and Pa are taken into the apparatus in the order named, and are stacked at the note outlet section 8.

The introduction of the notes in the individual storage sections will be considered to have been completed if the remaining note check sensors 35*b*, 35*c* and 35*d* are changed from "dark" to "light", when the separator mechanisms 24, 25 and 26 reach their corresponding advanced position detectors 101, and if no notes are delivered to the passage sensors 34*e*, 34*f* and 34*g* even though the vane wheels 55 and 56 are raced for some five turns. In FIG. 7, a full-line arrow represents the flow of deposited notes P to be returned. That is, the deposited notes P are returned through the fourth conveyor path 32*d*, part of the first conveyor path 32*a* and the tenth conveyor path 32*j*.

The depositor's reception of the automatically returned notes can be detected through the change from "dark" to "light" of the sixth sensor 35*f* which detects the existence or nonexistence of notes in the note outlet section 8. Thereafter, the motors 95 for the individual storage sections 14, 15 and 16 are driven to pull the movable frames 90. Thus, the movable frames 90 of all of the separator mechanisms 24, 25 and 26 are returned to their initial positions detected by the detectors 100 to complete a series of operations. Also, the motors 95 are stopped. Thus, the state shown in FIG. 2 is resumed.

The flappers 92*a*, 92*b* and 92*c* should be thick enough to prevent the previously collected notes P inside the separator mechanisms 24, 25 and 26 from being picked up together with the notes stored in the temporary storage spaces 27, 28 and 29 to be returned automatically. Preferably, the thickness of each flapper ranges from 10 mm to 15 mm. Therefore, lightweight plastics, such as polyacetal, should be used as the material for the flappers 92*a*, 92*b* and 92*c*.

When the flappers 92*a*, 92*b* and 92*c* are in their foremost positions, there are gaps of 0.5 mm between these flappers and the vane wheels 55 and 56. To maintain these gaps, stoppers (not shown) are attached individually to the front sides of the separator mechanisms 24, 25 and 26.

Figure 8:
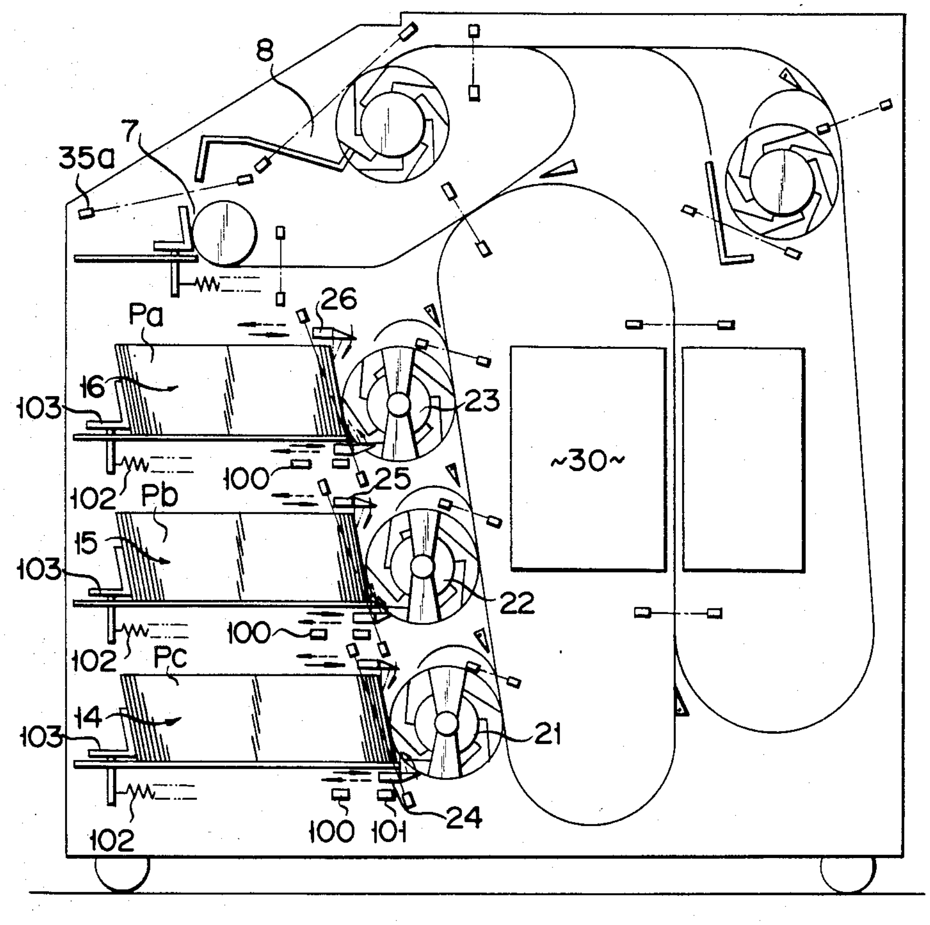
FIG. 8 is a side view for schematically illustrating the operation of the separator mechanisms for storing deposited notes.

Referring now to FIGS. 2, 5 and 8 the manner of receiving the deposited notes will be described. When the sensor 35*a* at the note inlet section 7 is changed from "dark" to "light" after the introduction of the notes P is completed, the approval step is started. If a command "acceptable" is obtained after on-line communication with the host computer when the approval button is depressed, the rotary solenoids 93 and 94 shown in FIG. 5 are actuated to swing both the upper and lower flappers 92*a*, 92*b* and 92*c* to the horizontal position. As a result, the groups of notes P previously stored in the individual storage sections 14, 15 and 16 are pushed forward by the backup members 103 urged by the pressure springs 102. Thus, these notes P join those collected in the temporary storage spaces 27, 28 and 29, and abut against their corresponding collection/takeout devices 21, 22 and 23. Thereafter, the motors 95 are reversed to move the movable frames 90 mounted with the separator mechanisms 24, 25 and 26 toward the advanced positions while keeping the rotary solenoids 93 and 94 excited so that the flappers *92a*, *92b* and *92c* are horizontal. Then, meeting with no resistance from the notes P, the movable frames 90 advance and reach the advanced position (FIG. 8). At the same time, the flappers *92a*, *92b* and *92c* enter the gaps between the conveyor belts 71, 72 and 73 and the vane wheels 55 and 56 and between the belts 71, 72 and 73 and the takeout chips. In this position, if the rotary solenoids 93 and 94 are demagnetized, the flappers *92a*, *92b* and *92c* rotate through 90° to set their claws 91 in the upright position. If the motors 95 are then rotated in the forward direction, the whole sets of notes P are pulled back by the wires 99 to resume the initial state (FIG. 2).

Figure 9:
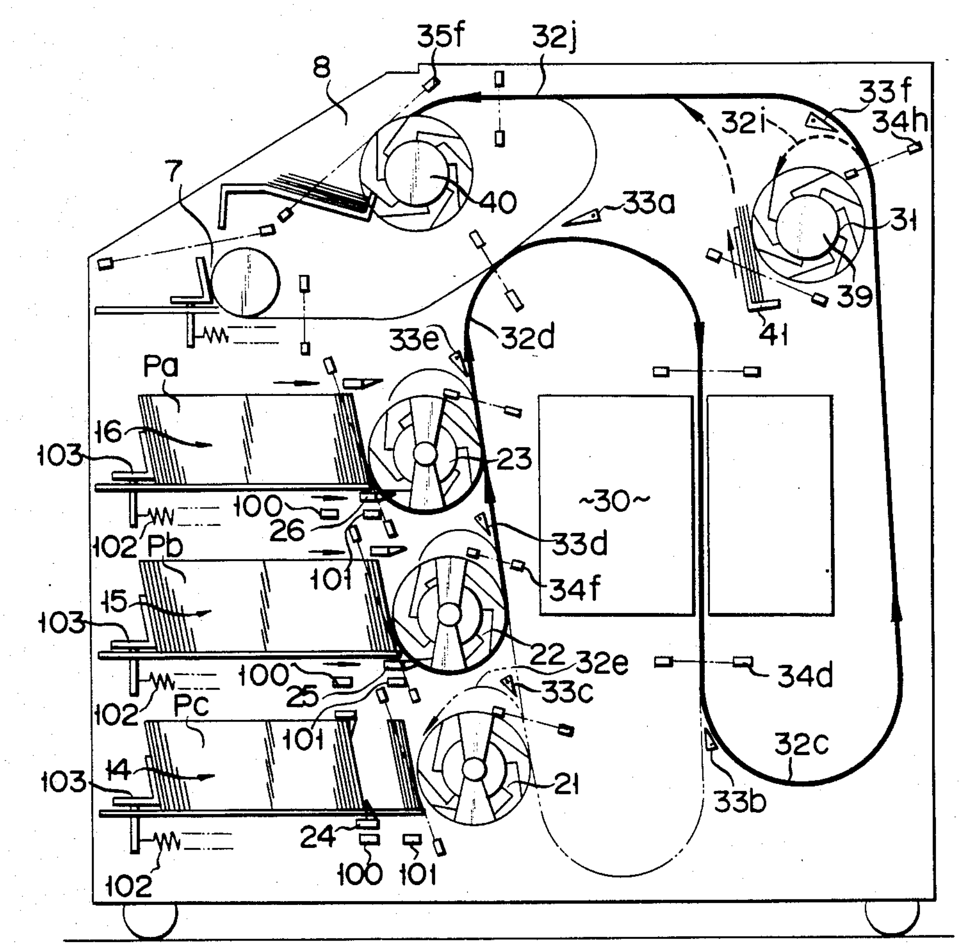
FIG. 9 is a side view for schematically illustrating the flow of notes to be dispensed.

Referring now to FIGS. 2, 5 and 9, the cash dispensing operation will be described in detail.

After the denominations and amount of notes P to be dispensed are designated by means of the teller's window apparatus 4, the CPU of the depositing/dispensing apparatus 1 communicates with the host computer on the basis of the on-line system for the collation of balance in the passbook account. If the designated amount is less than the balance, the apparatus starts to make arrangements for payment or dispensation. First, the rotary solenoids 93 and 94 are actuated to make the flappers *92a*, *92b* and *92c* of the separator mechanisms 26 and 25 of the first and second storage sections 16 and 15 horizontal. As a result, the first- and second-denomination notes Pa and Pb, which have so far been held in the first and second storage sections 16 and 15 with gaps kept from the collection/takeout devices 23 and 22 by the flappers *92a*, *92b* and *92c*, are pressed against the collection/takeout devices 23 and 22, respectively, by the backup members 103 urged by the pressure springs 102, as shown in FIG. 9. The separator mechanisms 26 and 25 and their corresponding movable frames 90 are not moved by the motors 95, and are held in the positions detected by the initial position detectors 100.

This is done because if the lower flappers *92a*, *92b* and *92c* advance to their advanced positions, they penetrate into the spaces between the belts 71, 72 and 73, the vane wheels 55 and 56, and the takeout chips *60a* and *61a* or *60b* and *61b*, to interfere with the introduction of the notes P.

In taking out the second-denomination notes Pb from the second storage section 15, the external vacuum generator or vacuum pump is operated to raise the degree of vacuum inside the bore 82 which extends along the axis of the main shaft 50. The suction holes 83 in the takeout chips *60a*, *61a*, *60b* and *61b* connect with the bore 82 to be subjected to negative pressure. Thus, the second-denomination notes Pb are attracted to the takeout chips *60a* and *61a* or *60b* and *61b*. Meanwhile, the notes Pb are separated from one another between the takeout chips and the brake belts 89 for preventing the feed of two superposed notes, and are delivered to the fourth conveyor path *32d*. The sixth detector *34f* detects the delivery of the second-denomination notes Pb to the fourth conveyor path *32d*, and counts the delivered notes Pb. Since a designated number of notes are thus detected and counted by the sixth detector *34f* positioned as illustrated, an extra second-denomination note Pb will be taken out even if the half-turn electromagnetic clutch 79 is released immediately after the delivery of the designated number of notes. This extra note Pb is handled as a rejected note which lowers the efficiency of fund operations.

In this embodiment, therefore, the rotors 60 and 61 are rotated continuously until the number of the second-denomination notes Pb counted by the sixth detector *34f* reaches the designated number minus one. Thereafter, the rotors 60 and 61 are driven for a half turn, and the sixth detector *34f* detects the delivery of an additional second-denomination note Pb. Thereupon, the delivery or takeout of the second-denomination notes Pb from the second storage section 15 is considered to have been completed.

If a single second-denomination note Pb is required to be dispensed, then it is taken out by causing the rotors 60 and 61 as the takeout mechanisms to make only a half turn without the use of the sixth detector *34f*. The second-denomination note Pb taken out in this manner is passed through the judgment section 30 for the denomination detection, authenticity detection, fit/unfit detection and obverse/reverse detection.

The denomination detection is not required for those notes which have been examined at depositing. However, it is required for those notes which are set in the second cashbox 18 for supplementation by a clerk in charge because they are subject to setting errors.

For the same reason, the authenticity detection is also required at dispensation. Superposed notes are handled as counterfeit notes, since they do not clearly show their features.

The most soiled note should be accepted so long as it is a distinguishable genuine note at depositing. Soiled genuine notes are referred to as unfit notes, which are to be replaced with new notes and abandoned by the National Bank.

These unfit notes must absolutely be prevented from being delivered to customers. At the time of dispensation, therefore, the notes P must be examined thoroughly, and those notes which are soiled, damaged, mended with adhesive tape, and/or dog-eared, and are therefore judged unfit, must be rejected. These unfit notes are fed to the fourth conveyor path *32d*, as indicated by two-dot chain line in FIG. 9, as the second distributing gate *33b* is rocked to the right by the rotary solenoid (not shown) so as to close the third conveyor path *32c* when the forward ends of the notes P reach the fourth detector *34d*. While the notes P are being taken out, the third distributing gate *33c* is kept in the right position to close the fourth conveyor path *32d* so that the rejected unfit notes are fed and collected in the third storage section 14 through the fifth conveyor path *32e*.

Thus, the third storage section 14, which receives only the third-denomination notes Pc at depositing, receives the rejected unfit notes at dispensation. Normally, in the dispensing operation, the rotors 60 and 61 with the takeout chips *60a*, *61a*, *60b* and *61b* thereon are stopped when the counted number of notes reaches the designated number minus one, and are then rotated an additional half turn for the designated number, as mentioned before. If there are such rejected notes, they are not counted, and the dispensing operations is continued.

The orientation and denomination of the deposited notes P are normally mixed up when they are set in the note inlet section 7. At the window of a financial agency, tellers always orient notes P before they hand them to their customers. In the depositing/dispensing apparatus of the invention, the notes to be dispensed are oriented as follows. As the second distributing gate *33b* is turned to the left so as to close the fourth conveyor path *32d*, uninverted notes P are transferred to the third conveyor path *32c*. If the notes P are judged reversed by the obverse/reverse detection at the judgment section 30, then the sixth distributing gate 33*f* is turned to the right to close the third conveyor path 32*c* when the forward ends of the notes P reach the eighth sensor 34*h*. Thus, the reversed notes P are temporarily collected on the bearer 41 of the reversal section 31 through the ninth conveyor path 32*i*, as indicated by broken line in FIG. 9. The collection at the reversal section 31, like the collection at the note outlet section 8, is achieved by the use of the vane wheels 39. Unreversed notes P are passed straight through the third conveyor path 32*c* to be collected at the note outlet section 8 without being fed to the reversal section 31, as indicated by full-line arrow in FIG. 9. After a designated number of second-denomination notes Pb are all collected in the note outlet section 8 or the reversal section 31, the bearer 41 is moved, and the pinch rollers (not shown) are actuated by the magnet to collectively transfer the second-denomination notes Pb in the reversal section 31 to the note outlet section 8 while holding the notes Pb in cooperation with the belts. The vane wheels 40 at the note outlet section 8 serve to slow down the movement of the notes P delivered thereto one after another at high speed, thereby softly guiding and collecting the notes P. So long as the number of the notes P delivered is not more than a predetermined number, the vane wheels 40 can guide the notes P also collectively. If the predetermined number is exceeded, the notes P will run out of the vane wheels 40 causing defective collection.

During the takeout of the notes P, therefore, those notes P judged reversed by the judgment section 30 are counted. When the counted number of the reversed notes P reaches a predetermined value even though the designated number for the takeout is not reached yet, the takeout operation is interrupted. In this state, the reversed notes P are transferred from the reversal section 31 to the note outlet section 8, and then the takeout operation is resumed and continued until the designated number is reached.

When the takeout of the second-denomination notes Pb from the second storage section 15 is completed in this manner, the same operation is repeated for the first-denomination notes Pa from the first storage section 16. The first-denomination notes Pa are stacked over the second-denomination notes Pb. After the takeout is all completed, the drive of the conveyor belts 71, 72, 73, 76, 77 and 78 and the vacuum pump is stopped. When the sixth sensor 35*f* detects the teller's receipt of the dispensed notes P, the respective motors 95 of the separator mechanisms 26 and 25 at the first and second storage sections 16 and 15 are rotated in the reverse direction to advance the separator mechanisms 26 and 25 until they are detected by their corresponding advanced position detectors 101. Thereafter, the rotary solenoids 93 and 94 are demagnetized to erect the flappers 92*a*, 92*b* and 92*c*, and the motors 95 are rotated in the forward direction to pull back the separator mechanisms 26 and 25 by means of the wires 99 until the mechanisms 26 and 25 are detected by their corresponding initial position detectors 100. Thus, the state of FIG. 2 is established.

If there are any rejected notes P, the same operation as the deposited note collection is performed for the third storage section 14. First, the flappers 92*a*, 92*b* and 92*c* are made horizontal to advance the separator mechanism 24. Then, the flappers 92*a*, 92*b* and 92*c* are erected, and the separator mechanism 24 is pulled back to the initial position by the motor so that the rejected notes P at dispensation can be collected together with the deposited third-denomination notes Pc.

In taking out the notes P by means of the rotors 60 and 61 as the takeout mechanisms, every two adjacent notes P are rubbed by the brake belts 89A to prevent the delivery of superposed notes, and are delivered one by one. Accordingly, the note P on the takeout mechanism side is normally projected a little outward from the storage section 14, 15 or 16 so that its forward end is at the nip portion between the rollers 60 and 61 and the brake belts 89A. Therefore, if the rotary solenoids 93 and 94 are demagnetized to erect the upper and lower flappers 92*a*, 92*b* and 92*c* immediately after the completion of the delivery, all the notes P may possibly not be pulled back to the original position. Accordingly, only the main shaft 50 supporting the rollers 60 and 61 is reversely rotated for a short time after the completion of the delivery. By doing this, the slightly projected note P between the brake belts 89A and the takeout chips 60*a* and 61*a* or 60*b* and 61*b* is also fully returned to its corresponding storage section. After this state is established, the upper and lower flappers 92*a*, 92*b* and 92*c* are erected so that all the notes P can be pulled back to the initial position by the flappers 92*a*, 92*b* and 92*c*.

In the above embodiment, moreover, the depositing/dispensing apparatus has been described as being of a teller-operated type. However, if inlet and outlet door mechanisms are attached to the top of the note inlet section 7 and the front of the note outlet section 8, respectively, then the depositing/dispensing apparatus may be used as a customer-operated unit.

It is to be understood that this invention is not limited to the aforementioned embodiment, and that various changes and modifications may be effected therein by one skilled in the art without departing from the scope or spirit of the invention.

According to this invention, as described in detail herein, there is provided an automatic depositing/dispensing apparatus of a note circulation type, improved in compactness to be adapted for teller window operation, in which partitioning means capable of reciprocation is attached to a note storage section to provide a temporary storage space therein, whereby the overall space for storage is minimized.

What is claimed is:

1. An automatic depositing/dispensing apparatus which stores deposited notes together with previously stored notes and appropriates the deposited notes for dispensation, comprising:

a housing having a note inlet and a note outlet;

a plurality of note storage means in the housing each storing deposited notes of a denomination;

first conveyor means for transferring notes inserted in the note inlet to the individual note storage means; and second conveyor means for transferring to the note outlet notes taken out of the individual note storage means, each said note storage means including a note storage chamber into which notes are collected in one direction, collection/takeout means disposed at one end portion of the note storage chamber, whereby the deposited notes from the first conveyor means are led and collected into the note storage chamber, and the notes collected in the note storage chamber are taken out and delivered to the second conveyor means, partitioning means capable of selectively assuming a first posture to engage both side edges of the notes stored in the note storage chamber or a second posture removed from the side edges, and movable between a first position inside the note storage chamber and a second position adjacent to the collection/takeout means, so that a temporary storage space is defined between the collection/takeout means and the partitioning means in the first posture and in the first position, and drive means holding the partitioning means in the first posture and in the first position at the time of deposition to keep the deposited notes in the temporary storage space, and shifting the partitioning means to the second posture and the second position and then to the first posture and the first position in taking out the deposited notes kept in the temporary storage space, and shifting at dispensation the partitioning means to the second posture and the second position.

2. The automatic depositing/dispensing apparatus according to claim 1, wherein each said note storage means includes first urging means for urging a bundle of stored notes toward the collection/takeout means.

3. The automatic depositing/dispensing apparatus according to claim 2, wherein said first urging means includes a backup plate abutting against the note located at the other end portion of the note storage chamber, and an urging member for urging the backup plate toward the collection/takeout means.

4. The automatic depositing/dispensing apparatus according to claim 1, wherein said partitioning means includes a frame surrounding the notes and movable along said one direction, and claw means attached to the frame so as to be rockable between the first and second postures.

5. The automatic depositing/dispensing apparatus according to claim 4, wherein said claw means includes a pair of flappers attached to the upper and lower edge portions of the frame and can engage the upper and lower side edges of the notes.

6. The automatic depositing/dispensing apparatus according to claim 5, wherein said drive means includes first drive means for shifting the flappers between the first and second postures and second drive means for reciprocating the frame between the first and second positions.

7. The automatic depositing/dispensing apparatus according to claim 6, wherein said second drive means includes second urging means for urging the frame from the first position to the second position, a motor, and a wire connecting the drive shaft of the motor and the frame.

* * * * *